(12) United States Patent
Vassallo et al.

(10) Patent No.: US 6,275,372 B1
(45) Date of Patent: Aug. 14, 2001

(54) ENERGY STORAGE DEVICE

(75) Inventors: Anthony Michael Vassallo, Hornsby Heights; Sarkis Minas Keshishian, Ryde, both of (AU)

(73) Assignees: Energy Storage Systems Pty. Ltd., Villawood (AU); Commonwealth Scientific Industrial Research Organisation, Campbell (AU)

(*) Notice: Subject to any disclaimer, the term of this patent is extended or adjusted under 35 U.S.C. 154(b) by 0 days.

(21) Appl. No.: 09/424,669

(22) PCT Filed: Jun. 1, 1998

(86) PCT No.: PCT/AU98/00406

§ 371 Date: Mar. 9, 2000

§ 102(e) Date: Mar. 9, 2000

(87) PCT Pub. No.: WO98/54739

PCT Pub. Date: Dec. 3, 1998

(30) Foreign Application Priority Data

May 30, 1997 (AU) .................................................. PO 7094

(51) Int. Cl.[7] ...................................................... H01G 4/32
(52) U.S. Cl. ......................... 361/511; 361/520; 361/530; 361/538; 361/540
(58) Field of Search .................................... 361/502, 511, 361/512, 520, 530, 515, 531, 533, 538, 540, 301.4, 306.1, 29.42; 29/25.41

(56) References Cited

U.S. PATENT DOCUMENTS

| 774,115 | * | 11/1904 | Splitdorf | ............................ | 361/301.5 |
| 2,926,109 | * | 2/1960 | Lilienfeld | ............................... | 205/209 |
| 3,891,901 | * | 6/1975 | Booe et al. . | | |

* cited by examiner

Primary Examiner—Anthony Dinkins
(74) Attorney, Agent, or Firm—Kenyon & Kenyon

(57) ABSTRACT

An energy storage device in the form of a cylindrical double layer capacitor (1) includes a plurality of integrally formed first electrode members (2) which each extend between a first end (3) and a second end (4). A plurality of integrally formed second electrode members (5) each extend between a third end (6) and a fourth end (7). As shown, members (5) are interleaved with members (2) such that ends (7) are located intermediate ends (3, 4) of the adjacent members (2). An insulator in the form of carbon layer (8) are disposed between adjacent members (2, 5) to prevent electrical contact therebetween. First contact means in the form of flanges (11) extend from respective ends (3) of each member (2) and electrically connect all the first members. Flanges (11) provide a site for the metallisation of particles thereupon. Those particles form a porous connection layer (12) for an electrical terminal (13) for members (2). Flanges (11) also form a barrier against the ingress of the particles beyond ends (3).

32 Claims, 4 Drawing Sheets

ENERGY STORAGE DEVICE

FIELD OF THE INVENTION

The invention relates to an energy storage device and a method for producing such a device.

The invention has been developed primarily for use with carbon double layer capacitors and will be described hereinafter with reference to that application. However, it will be appreciated that the invention is not limited to that particular field and is also suited to other double layer capacitors, dielectric capacitors, electrochemical cells and other energy storage devices.

BACKGROUND OF THE INVENTION

It is known to construct both dielectric and double layer capacitors in accordance with the following general steps. Initially, a pair of foil electrodes, with an appropriate intermediate dielectric or separator, as the case may be, are overlapped and wound together into a spiral configuration to define a cylindrical body. The nature of the overlap is such that the electrodes protrude from respective opposed axial ends of the body. For dielectric capacitors it is known from U.S. Pat. No. 1,479,315 to form a metallised layer on the two ends of the body and from U.S. Pat. No. 3,256,472 to subsequently solder lead wires, or terminals, to those layers. Insofar as double layer capacitors and other electrochemical cells are concerned the use of metallisation layers and soldering has not been effective due to corrosion problems arising from the use of an electrolyte within such cells.

Accordingly, for double layer capacitors the terminals are usually connected to the respective electrodes by "stakinge" or spot welding. While these operations have the advantage of simplicity and low cost they are also known to distort the shape of the electrodes and thereby compromise the quality and longevity of the capacitor. Additionally, the resultant electrical connection between the terminals and electrodes often have a high electrical resistance, thereby increasing the overall series resistance of the capacitor.

An alternative approach for double layer capacitors is to utilise a non-porous metallisation layer. In practical terms, however, this is unworkable, as the ingress of the electrolyte into the capacitor is slowed prohibitively.

The prior art also suffers from the limitations of forming a metallisation layer. More particularly, during metallisation it is known that some of the particles being applied will enter between the spaced apart portions of the electrode. If the number of such particles is sufficient they short circuit the two electrodes and either reduce the overall capacitance or render the capacitor defective. A partial solution to this problem is to reducing the overlap of the sheets so that the particles will have to travel further before contacting the other electrode. This, however, reduces the capacitance and increases the bulk of the resultant capacitor.

DISCLOSURE OF THE INVENTION

It is an object of the invention, at least in the preferred embodiments, to overcome or substantially ameliorate one or more of the disadvantages of the prior art.

According to a first aspect of the invention there is provided an energy storage device including:
  a plurality of first electrode members each extending between a first end and a second end;
  a plurality of second electrode members each extending between a third end and a fourth end wherein, in use, the second members are interleaved with the first members such that the third ends are located intermediate the fist and second ends of the adjacent first members;
  an insulator disposed between the adjacent first and second members to prevent electrical contact therebetween; and
  first contact means extending from at least one of the first ends and being electrically connected to all the first members, said means providing:
    (a) a site for the metallisation of particles thereupon such that said particles form a connection layer for an electrical terminal for the first members; and
    (b) a barrier against the ingress of said particles beyond said first ends.

Preferably, the second ends of the first members are located intermediate the third and fourth ends of the adjacent second members and the device includes second contact means extending from at least one of the fourth ends and being electrically connected to all the second members, said second means providing:
    (a) a site for the metallisation of particles thereupon such that said particles form a connection layer for an electrical terminal for the second members; and
    (b) a barrier against the ingress of said particles beyond said fourth ends.

Preferably also, the first members are integrally formed from a first conductive sheet and the second members are integrally formed from a second conductive sheet, the first and second sheets being adjacent each other and wound in a spiral.

In a preferred form, the contact means includes a flange extending away from the first end of each first member, each flange overlapping with at least one adjacent flange.

Preferably, the connection layer is porous to allow passage therethrough of an electrolyte. More preferably, the connection layer extends over less than all of the contact means.

In some embodiments the porosity is provided by macroscopic discontinuities in the connection layer. For example, the connection layer can include a plurality of spaced apart discontinuities such as apertures. In other embodiments the porosity is provided by microscopic discontinuities in the connection layer.

Preferably also the terminal is welded to the connection layer.

According to a second aspect of the invention there is provided a method for producing an energy storage device of the type including a plurality of first electrode members each extending between a first end and a second end and a plurality of second electrode members each extending between a third end and a fourth end, the method including the steps of:
  interleaving the second members with the first members such that the third ends are located intermediate the first and second ends of the adjacent first members;
  disposing an insulator between the adjacent first and second members to prevent electrical contact therebetween; and
  providing first contact means which extend from at least one of the first ends and which is electrically connected to all the first members, said means providing a first site for metallisation of particles thereupon and a barrier against the ingress of said particles beyond said first ends; and
  directing a stream of said particles toward said site such that said particles metallise to form a connection layer for an electrical terminal for the first members.

Preferably, the method includes the further steps of:

locating the second ends of the first members intermediate the third and fourth ends of the adjacent second members;

providing second contact means which extend from at least one of the fourth ends and which is electrically connected to all the second members, said second means providing a second site for metallisation of particles thereupon and a barrier against the ingress of said particles beyond said fourth ends; and directing a stream of said particles toward said second site such that said particles metallise to form a connection layer for an electrical terminal for the first members.

Preferably also, the method includes the steps of:

integrally forming the first members from a first conductive sheet and integrally forming the second members from a second conductive sheet;

disposing the first and second sheets adjacent to each other and separated by the insulator; and winding the sheets and the insulator in a spiral.

In a preferred form, the contact means is provided by a flange extending away from the first end of each first member, and the method includes the step of overlapping each flange with at least one adjacent flange during the winding.

Preferably, the connection layer is porous and said method includes the further step of passing an electrolyte through said metallisation and between said interleaved members.

Preferably also, the method includes the step of providing at least a portion of the connection layer with a substantially planar exterior surface. More preferably, the method also includes the step of attaching the terminal to the exterior surface. Most preferably the step of attaching includes welding. For example, in some embodiments the welding is by way of laser radiation.

According to a third aspect of the invention there is provided a termination for an electrode of an energy storage device, the termination including a metallisation layer which is electrically connected to the electrode, the layer being porous to allow passage of an electrolyte therethrough.

Preferably, the porosity is provided by macroscopic discontinuities in said layer. More preferably, the layer includes a plurality of spaced apart discontinuities.

In alternative embodiments the porosity is provided by microscopic discontinuities in the layer.

Preferably also at least a portion of the layer includes a substantially planar exterior surface. More preferably, a terminal is attached to the exterior surface. Even more preferably, the terminal is attached to the exterior surface by welding. For example, the welding can be achieved by way of laser radiation.

BRIEF DESCRIPTION OF THE DRAWINGS

Preferred embodiments of the invention will now be described, by way of example only, with reference to the accompanying drawings in which.

PREFERRED EMBODIMENT OF THE INVENTION

Figure 1:
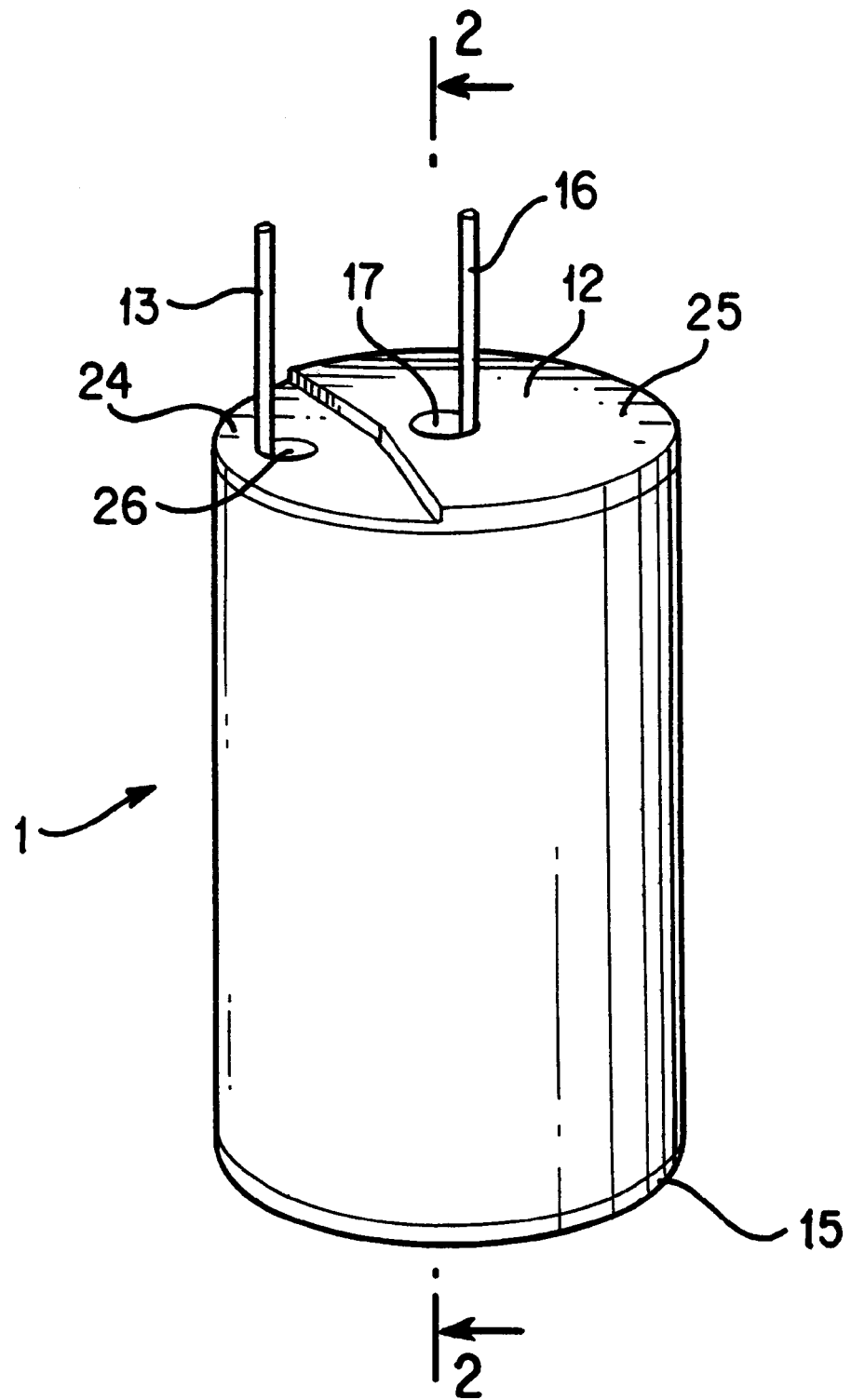
FIG. 1 is a schematic perspective view of a cylindrical double layer capacitor embodying the present invention.
Figure 2:
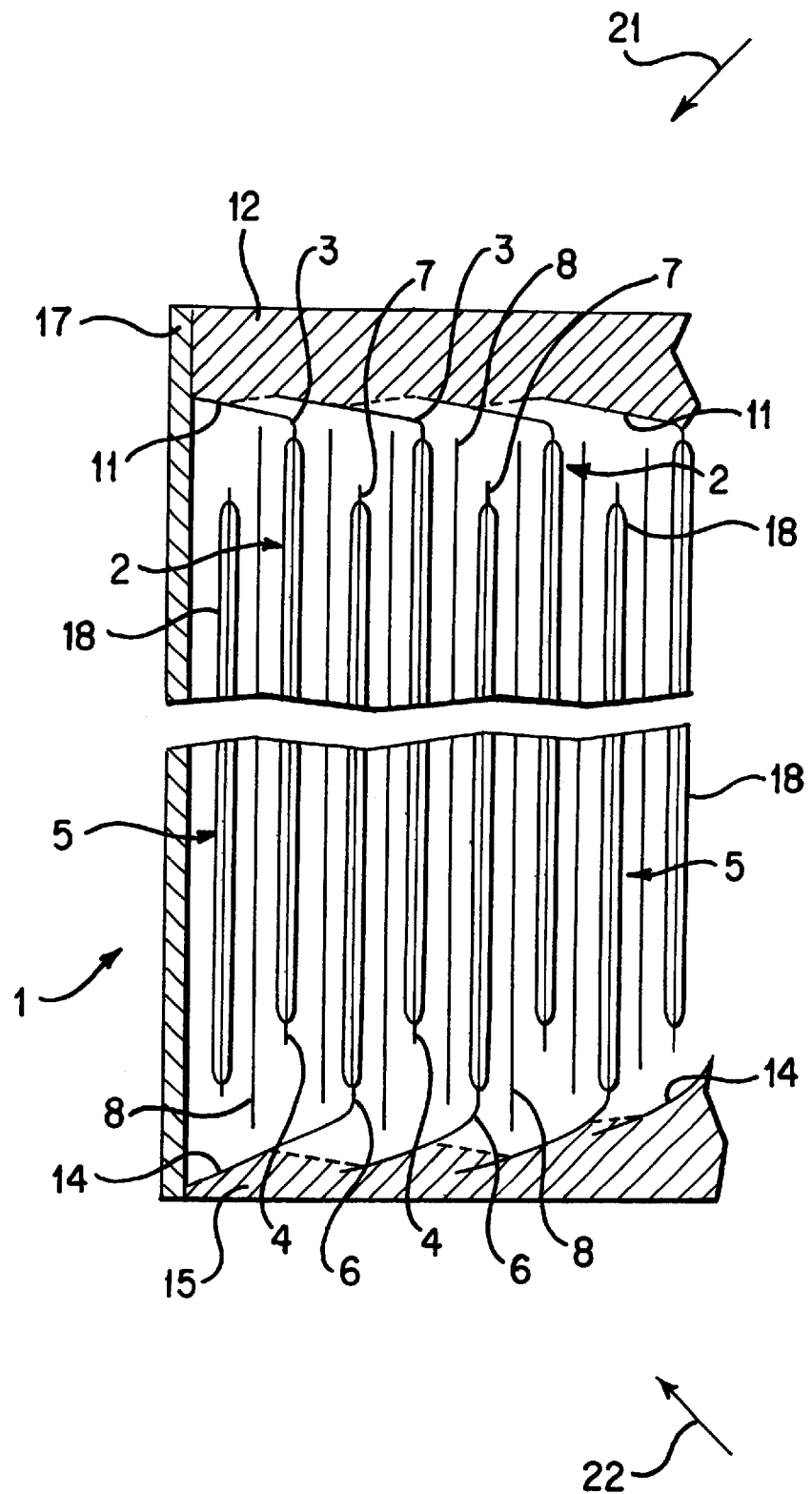
FIG. 2 is a cross sectional view taken along line 2—2 of FIG. 1.

Referring to FIG. 1 and FIG. 2, a cylindrical double layer capacitor 1 includes a plurality of integrally formed first electrode members 2 which each extend between a first end 3 and a second end 4. A plurality of integrally formed second electrode members 5 each extend between a third end 6 and a fourth end 7. As shown, members 5 are interleaved with members 2 such that ends 7 are located intermediate ends 3 and 4 of the adjacent members 2. An insulator in the form of permeable separators or membranes 8 are disposed between adjacent members 2 and 5 to prevent electrical contact therebetween. First contact means in the form of flanges 11 extend from respective ends 3 of each member 2 and electrically connect all the first members. Flanges 11 provide a site for the metallisation of particles thereupon. Those particles form a porous connection layer 12 for an electrical terminal 13 for members 2. Flanges 11 also form a barrier against the ingress of the particles beyond ends 3.

Ends 4 of members 2 are located intermediate ends 6 and 7 of the adjacent members 5. Moreover, capacitor 1 includes second contact means in the form of flanges 14 which extend from respective ends 6 and are electrically connected to all the second members. Flanges 14 provide a site for the metallisation of particles thereupon. These particles form a porous connection layer 15 for an electrical terminal 16 for the members 5. Similar to layer 12, layer 15 provides a barrier against the ingress of the particles beyond ends 6 and into the capacitor.

Members 2 are integrally connected and formed from a first continuous conductive sheet. Similarly, members 5 are integrally connected and formed from a second continuous conductive sheet. These sheets are initially coated on each side with layers 18 of activated carbon. As will be appreciated by those skilled in the art, the activated carbon provides a large effective surface area and, as such, is a preferred material for optimising capacitance.

Once so coated, the sheets are overlapped with membrane 8 disposed therebetween. This combination is then wound onto a hollow cylindrical former 17 to form a spiral. Flanges 11 and 14 are continuous and defined by an extension of the ends 3 and 6. Further, both flanges initially protrude directly outwardly from the respective ends. However, during the winding operation, flanges 11 and 14 are progressively deformed such that they overlie at least the adjacent inner end 3 or 6 respectively. More preferably, the flanges contact the adjacent inner end. After the winding operation the sheets and separator are wrapped in paper to protect the longitudinal sides, although leaving the now down turned flanges 11 and 14 exposed.

In a less preferred embodiment the deforming of the flanges occurs as a separate step following the winding.

In other embodiments of the invention the capacitor is in the form illustrated in Australian Provisional Application No. PP2972, that is, in the form of a plurality of folded sheets. In some of these embodiments use is made of two single flanges which overlie a respective plurality of ends 3 and 6.

Layers 12 and 15 are then sequentially formed on respective exposed flanges 11 and 14. The metallisation is achieved by directing a flow of molten particles in the directions generally indicated by arrows 21 and 22 toward flanges 11 and 14 respectively. The configuration of flanges 11 and 14 poses a barrier to the ingress of the metal spray particles beyond ends 3 and 6 respectively and therefore greatly reduces the risk of shorting between the electrodes. Additionally, and as will be further enunciated below, flanges 11 and 14 still allow the passage of electrolyte into capacitor 1.

The metal spray is produced using a "Metco" oxyacetylene spray gun. This equipment uses a 3 mm aluminium wire feed and standard oxygen and acetylene bottles. The wire is fed between 1.4 and 1.8 cm per second, and no more than about 1 to 2 seconds dwell time is permitted on the element at a distance of 20 cm from the tip of the gun. As stated above, it is preferred that the flow of metal spray is directed toward the flanges from a position radially outwardly from the capacitor to minimise the risk of any ingress of particles. Preferably also, the gun is moved circumferentially with respect to the cylindrical capacitor 1 to provide all the particles with a substantially uniform angle of approach to all portions of the flanges. In other embodiments, however, flanges 11 and 14 are folded into sufficiently secure engagement with the adjacent ends 3 and 6 respectively that the particles are applied in a flow with no radial component.

Movement of the spray gun is repeated three times for each of flanges 11 and 14, followed by a period of cooling then repetition until a substantially flat aluminium surface 23 is produced.

Cooling periods are necessary since the separators may soften at temperatures of about 100° C. and may shrink in the cross direction above that temperature.

If necessary, after spraying, either or both of layers 12 and 15 are ground on a rotary sander to provide a substantially planar surface 24. In some embodiments, grinding or other machining is also applied between coats of the spray. This grinding or machining is carried out to ensure that surface 24 is sufficiently configured for an electrical terminal 13 and 16 to be attached. In this embodiment surface 24 does not extend over the entirety of the exterior surface 25 of layer 12 although in other embodiments this is the case. Moreover, although layer 15 will include a similar substantially planar surface 24, it need not be of the same size as the surface 24 located on layer 12.

Terminals 13 and 16 will typically have at one end a 10 mm wide flat tab 26 to facilitate attachment to respective surfaces 24. Tabs 26 will be pressed to a thickness of approximately 0.35 mm.

Although hidden in FIG. 1, terminal 16 is welded radially on layer 15 and then extends axially up the centre of former 17. Terminal 13, on the other hand, is welded tangentially across layer 12. Preferably, the layers 12 and 15 are continuous in the region of the attachment of terminals 13 and 16 respectively.

Both terminals 13 and 16 are welded to the associated layers using laser welding equipment such as a pulsed YAG laser. Two 8 mm rows of welds 3 mm apart on each tab can be used as a minimum. The laser is moved at 140 mm/min while being pulsed at 10 Hz with an energy of 29.5 joules/pulse to provide sufficient energy to weld the tabs to the sprayed aluminium surface. Insufficient energy will fail to weld the tab while excess energy may cause the beam to penetrate the spray and ignite the carbon.

In other embodiments terminals 13 and 16 are welded ultrasonically to respective layers 12 and 15.

The construction is completed by placing the capacitor into a canister from which the terminals protrude. Electrolyte is then introduced into the capacitor through one or both of porous layers 12 and 15. After permeating through these layers, the electrolyte moves between the overlapping portions of respective flanges 11 and 14 and into the cavities between the electrodes. Thereafter, the canister is sealed to entrap the electrolyte therein.

Figure 3:
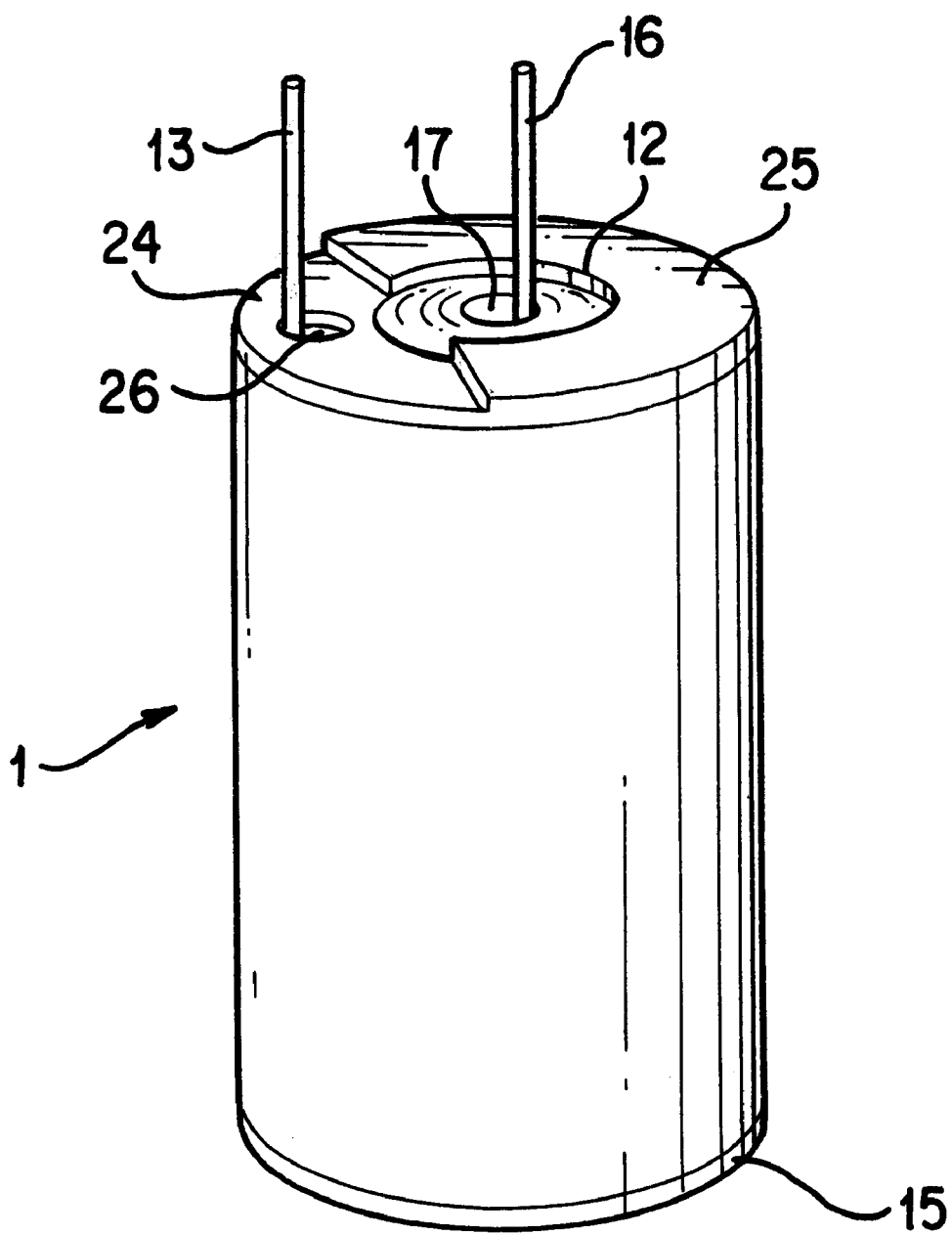
FIG. 3 is a top perspective view of an alternative embodiment of the invention.

Reference is now made to the alternative embodiment of the invention illustrated in FIG. 3, where corresponding features are denoted by corresponding reference numerals. More particularly, layer 12 is substantially annular and extends over less than all of the flanges 11. Accordingly, in this embodiment use is made of a non-porous layer 11 as the electrolyte is able to ingress into the capacitor between the exposed flanges.

In other embodiments use is made of a porous layer 12 that covers less than all of the flanges 11. That is, although a porous layer provides microscopic discontinuities, a similar effect can be achieved through provision of macroscopic discontinuities in a non-porous layer.

Figure 4:
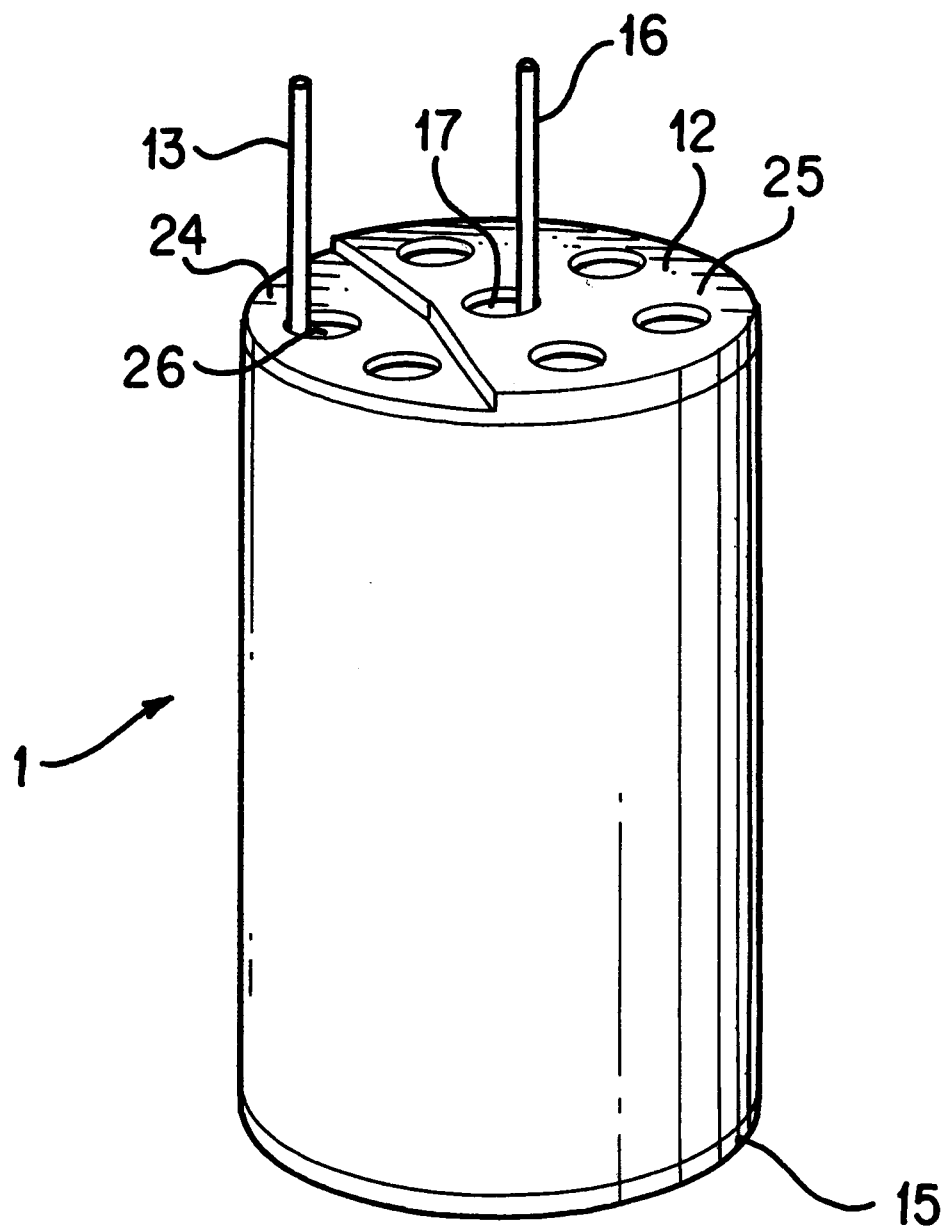
FIG. 4 is a view similar to FIG. 3 of another alternative embodiment of the invention.

Another example of macroscopic discontinuities are shown in the FIG. 4 embodiment. In this embodiment layer 12 includes a plurality of spaced apart apertures to facilitate passage of the electrolyte into the capacitor.

Metals other than aluminium are used in other embodiments if the electrolyte and operation voltage permit.

In another alternative the entire surfaces of the top and bottom of the capacitor are metallised, for instance with a solid former. Terminals are then spot welded to the metallised ends, or caps are welded to the ends. These capacitors are connected in series by butting the metallised ends together.

Although the invention has been described with reference to specific examples it will be appreciated by those skilled in the art that it may be embodied in may other forms.

What is claimed is:

1. An energy storage device including:
    a plurality of first electrode members each extending between a first end and a second end;
    a plurality of second electrode members each extending between a third end and a fourth end wherein, in use, the second members are interleaved with the first members such that the third ends are located intermediate the first and second ends of the first members, the first members being adjacent to the second members;
    an insulator disposed between the adjacent first and second members to prevent electrical contact therebetween;
    a contact means extending from at least one of the first ends and being electrically connected to all the first members, said means providing:
    (a) a site for metallization of particles thereupon such that said particles form a connection layer for an electrical terminal for the first members; and
    (b) a barrier against an ingress of said particles beyond said first ends; and p1 wherein the contact means includes a flange extending away from the first end of each first member, each flange overlapping with at least one adjacent flange.

2. An energy storage device including:
    a plurality of first electrode members each extending between a first end and a second end;
    a plurality of second electrode members each extending between a third end and a fourth end wherein, in use, the second members are interleaved with the first members such that the third ends are located intermediate the first and second ends of the first members, the first members being adjacent to the second members;
    an insulator disposed between the adjacent first and second members to prevent electrical contact therebetween;
    a contact means extending from at least one of the first ends and being electrically connected to all the first members, said means providing:
    (a) a site for metallization of particles thereupon such that said particles form a connection layer for an electrical terminal for the first members; and (b) a barrier against an ingress of said particles beyond said first ends; and wherein said connection layer is porous to allow passage therethrough of an electrolyte.

3. A device according to claim 2 wherein said connection layer extends over less than all of the contact means.

4. A device according to claim 2 wherein said porosity is provided by macroscopic discontinuities in said connection layer.

5. A device according to claim 4 wherein the connection layer includes a plurality of spaced apart discontinuities.

6. A device according to claim 2 herein said porosity is provided by microscopic discontinuities in said connection layer.

7. An energy storage device including:

a plurality of first electrode members each extending between a first end and a second end;

a plurality of second electrode members each extending between a third end and a fourth end wherein, in use, the second members are interleaved with the first members such that the third ends are located intermediate the first and second ends of the first members, the first members being adjacent to the second members;

an insulator disposed between the adjacent first and second members to prevent electrical contact therebetween;

a contact means extending from at least one of the first ends and being electrically connected to all the first members, said means providing:
(a) a site for metallization of particles thereupon such that said particles form a connection layer for an electrical terminal for the first members; and
(b) a barrier against an ingress of said particles beyond said first ends; and wherein said terminal is welded to a connection layer.

8. A method for producing an energy storage device including a plurality of first electrode members each extending between a first end and a second end and a plurality of second electrode members each extending between a third end and a fourth end, the method including the steps of:

integrally forming the first members from a first conductive sheet and integrally forming the second members from a second conductive sheet;

interleaving the second members with the first members such that the third ends are located intermediate the first and second ends of the first members, the first members being adjacent to the second members;

disposing an insulator between the adjacent first and second members to prevent electrical contact therebetween; and winding the sheets and the insulator in a spiral;

providing a contact means which extends from at least one of the first ends and which is electrically connected to all the first members, said means providing a first site for metallization of particles thereupon and a barrier against an ingress of said particles beyond said first ends; and directing a stream of said particles toward said site such that said particles metallize to form a connection layer for an electrical terminal for the first members.

9. A method according to claim 8 wherein the contact means is provided by a flange extending away from the first end of each first member, and the method includes the step of overlapping each flange with at least one adjacent flange during said winding.

10. A method for producing an energy storage device including a plurality of first electrode members each extending between a first end and a second end and a plurality of second electrode members each extending between a third end and a fourth end, the method including the steps of:

interleaving the second members with the first members such that the third ends are located intermediate the first and second ends of the first members, the first members being adjacent to the second members;

disposing an insulator between the adjacent first and second members to prevent electrical contact therebetween;

providing a contact means which extends from at least one of the first ends and which is electrically connected to all the first members, said means providing a first site for metallization of particles thereupon and a barrier against an ingress of said particles beyond said first ends;

directing a stream of said particles toward said site such that said particles metallize to form a connection layer for an electrical terminal for the first members; and wherein said connection layer is porous and said method includes the step of passing an electrolyte through said metallization and between said interleaved members.

11. A method according to claim 10 wherein said connection layer extends over less than all of the contact means.

12. A method according to claim 10 wherein said porosity is provided by macroscopic discontinuities in said connection layer.

13. A method according to claim 12 wherein the connection layer includes a plurality of spaced apart discontinuities.

14. A method according to claim 10 wherein said porosity is provided by microscopic discontinuities in said connection layer.

15. A method for producing an energy storage device including a plurality of first electrode members each extending between a first end and a second end and a plurality of second electrode members each extending between a third end and a fourth end, the method including the steps of:

interleaving the second members with the first members such that the third ends are located intermediate the first and second ends of the first members, the first members being adjacent to the second members;

disposing an insulator between the adjacent first and second members to prevent electrical contact therebetween;

providing a contact means which extends from at least one of the first ends and which is electrically connected to all the first members, said means providing a first site for metallization of particles thereupon and a barrier against an ingress of said particles beyond said first ends;

directing a stream of said particles toward said site such that said particles metallize to form a connection layer for an electrical terminal for the first members; and providing at least a portion of said connection layer with a substantially planar exterior surface.

16. A method for producing an energy storage device including a plurality of first electrode members each extending between a first end and a second end and a plurality of second electrode members each extending between a third end and a fourth end, the method including the steps of:

interleaving the second members with the first members such that the third ends are located intermediate the first and second ends of the first members, the first members being adjacent to the second members;

disposing an insulator between the adjacent first and second members to prevent electrical contact therebetween;

providing a contact means which extends from at least one of the first ends and which is electrically connected to all the first members, said means providing a first site for metallization of particles thereupon and a barrier against an ingress of said particles beyond said first ends;

directing a stream of said particles toward said site such that said particles metallize to form a connection layer for an electrical terminal for the first members; and attaching said terminal to said exterior surface.

17. A method according to claim 16 wherein said step of attaching includes welding.

18. A method according to claim 17 wherein said welding is by way of laser radiation.

19. A termination for an electrode of an energy storage device, the termination including a metallization layer which is electrically connected to the electrode, the layer being porous to allow passage of an electrolyte therethrough, wherein said porosity is provided by macroscopic discontinuities in said layer.

20. A termination according to claim 19 wherein the layer includes a plurality of spaced apart discontinuities.

21. A termination for an electrode of an energy storage device, the termination including a metallization layer which is electrically connected to the electrode, the layer being porous to allow passage of an electrolyte therethrough, wherein said porosity is provided by microscopic discontinuities in said layer.

22. A termination for an electrode of an energy storage device, the termination including a metallization layer which is electrically connected to the electrode, the layer being porous to allow passage of an electrolyte therethrough, wherein at least a portion of said layer includes a substantially planar exterior surface.

23. A termination according to claim 22 including a terminal attached to said exterior surface.

24. A termination according to claim 23 wherein said terminal is attached to said exterior surface by welding.

25. A termination according to claim 24 wherein said welding is by way of laser radiation.

26. A method of producing a termination for an electrode of an energy storage device, the method including the steps of:

forming a porous metallization layer on the electrode, wherein said porosity is provided by macroscopic discontinuities in said layer; and passing an electrolyte through the layer toward the electrode.

27. A method according to claim 26 wherein the layer includes a plurality of spaced apart discontinuities.

28. A method of producing a termination for an electrode of an energy storage device, the method including the steps of:

forming a porous metallization layer on the electrode, wherein said porosity is provided by microscopic discontinuities in said layer; and passing an electrolyte through the layer toward the electrode.

29. A method of producing a termination for an electrode of an energy storage device, the method including the steps of:

forming a porous metallization layer on the electrode;

passing an electrolyte through the layer toward the electrode; and providing at least a portion of said layer with a substantially planar exterior surface.

30. A method according to claim 29 including the further step of attaching a terminal to said exterior surface.

31. A method according to claim 30 including the of attaching said terminal to said exterior surface by welding.

32. A method according to claim 31 wherein said welding is by way of laser radiation.

* * * * *

UNITED STATES PATENT AND TRADEMARK OFFICE
CERTIFICATE OF CORRECTION

PATENT NO.    : 6,275,372 B1
DATED         : August 14, 2001
INVENTOR(S)   : Anthony Michael Vassallo et al.

It is certified that error appears in the above-identified patent and that said Letters Patent is hereby corrected as shown below:

Column 6,
Line 46, delete "p1".

Signed and Sealed this

Ninth Day of April, 2002

Attest:

JAMES E. ROGAN
*Attesting Officer*        *Director of the United States Patent and Trademark Office*